United States Patent [19]

Boehringer

[11] Patent Number: 5,224,668
[45] Date of Patent: Jul. 6, 1993

[54] TORQUE LINKAGE DAMPER

[75] Inventor: Wilfred E. Boehringer, Fullerton, Calif.

[73] Assignee: McDonnell Douglas Corporation, Long Beach, Calif.

[21] Appl. No.: 806,007

[22] Filed: Dec. 9, 1991

[51] Int. Cl.⁵ .......................... B64C 25/62; F16F 9/24
[52] U.S. Cl. .......................... 244/104 FP; 244/104 R; 188/266; 188/297
[58] Field of Search ......... 244/103 R, 104 R, 104 FP, 244/104 CS; 188/314, 281, 266, 313, 297, 306; 267/226

[56] References Cited

U.S. PATENT DOCUMENTS

| Re. 27,450 | 8/1972 | Boehringer et al. | 188/306 |
| 2,372,710 | 4/1945 | Chisholm, Jr. | 244/104 FP |
| 2,719,612 | 10/1955 | Bourcier de Carbor De Previnquieres . | |
| 2,757,762 | 8/1956 | Bourcier De Carbon | 188/314 |
| 4,284,178 | 8/1981 | Tomita et al. | 188/281 |

Primary Examiner—Joseph F. Peters, Jr.
Assistant Examiner—Virna Lissi Ansley
Attorney, Agent, or Firm—Max Geldin

[57] ABSTRACT

An aircraft landing gear damping mechanism improvement of a damper containing piston means in a chamber of a housing, an orifice in the piston means and Belleville springs disposed in the chamber between the wall of the chamber and the piston means on opposite sides thereof. The improvement comprises means, e.g. in the form of a member having slots therein, and disposed between one end of the Belleville springs and the adjacent chamber wall, providing fluid communication of the inner cavity and outer cavity of the chamber below and above the Belleville springs.

6 Claims, 2 Drawing Sheets

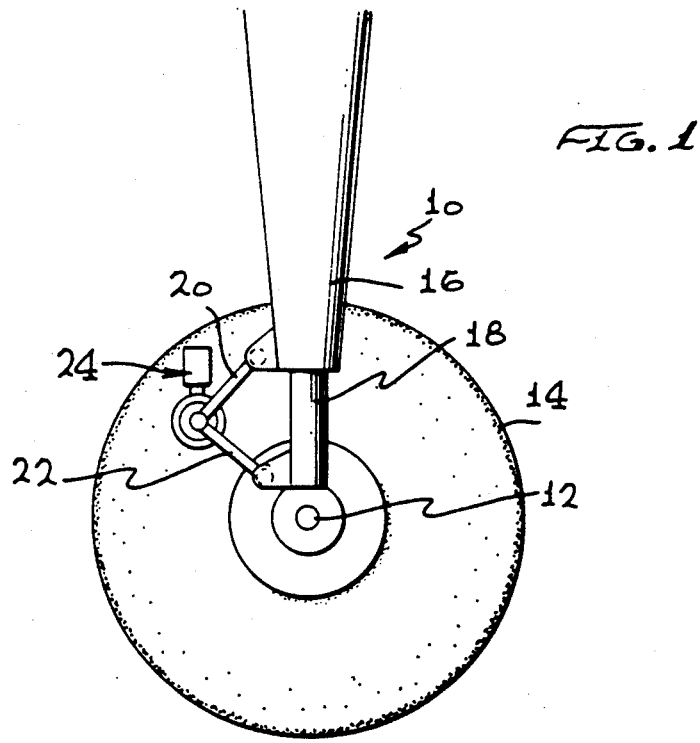
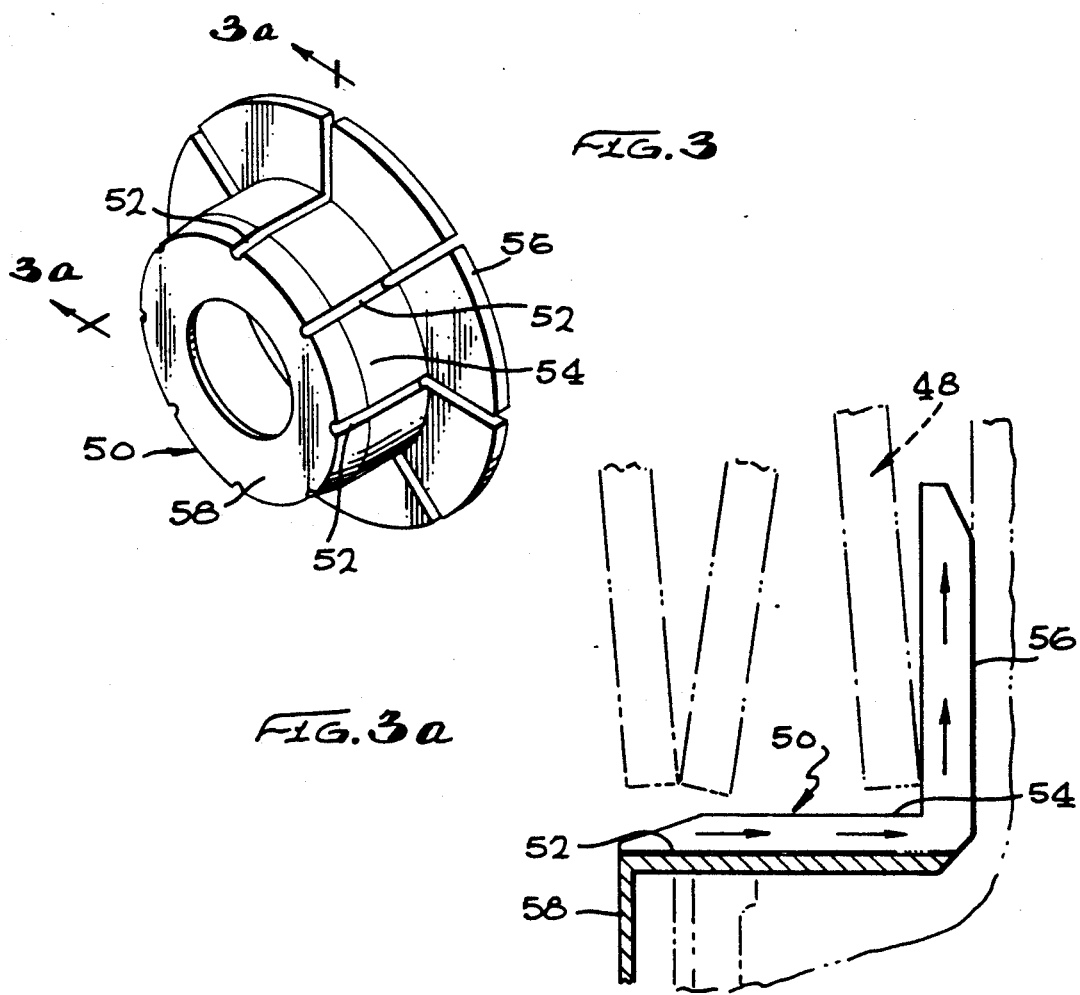

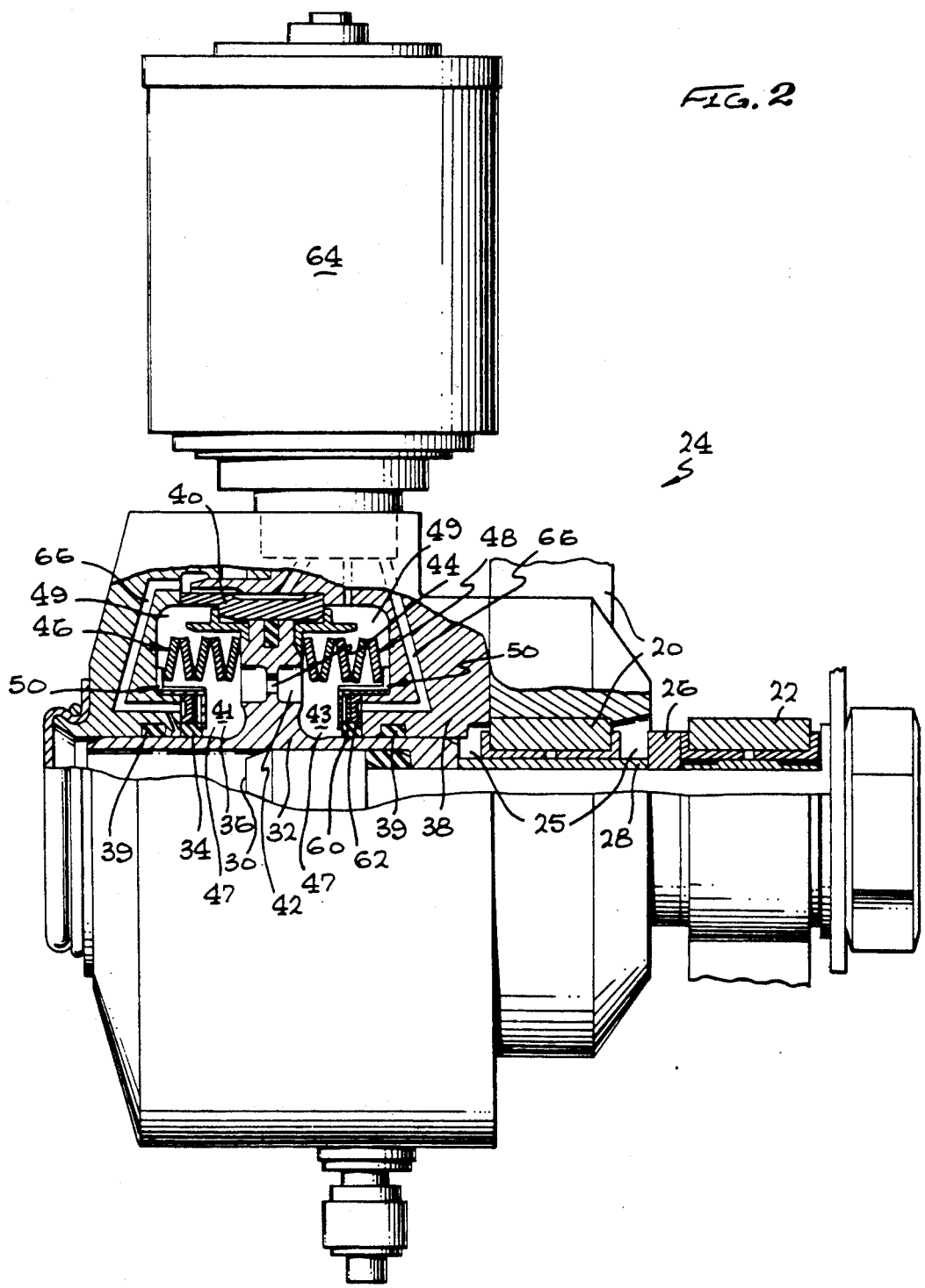

TORQUE LINKAGE DAMPER

BACKGROUND OF THE INVENTION

This invention relates to an aircraft landing gear damping mechanism, and is more particularly concerned with an improved damping mechanism of this type which operates directly in conjunction with the landing gear torque linkage and combines the function of a hydraulic damper and a spring type of damper.

In Reissue U.S. Pat. No. 27,450 to Boehringer et al, a torque linkage damper is disclosed for use in conjunction with a landing gear of an aircraft, particularly a landing gear with a telescoping strut. As noted therein it is common for the telescoping members of the landing gear strut to be connected together through a scissor type linkage commonly referred to as the torque arm linkage. In the above patent to avoid undesirable vibrational torque which is transmitted from the wheels of the aircraft and passed through such torque arm linkage, a damping apparatus is associated with such linkage and prevents the transmittal of the vibrational torque from one link to another link. In such device the body of the damper is connected to one torque link and the piston of the damper is connected to the other torque link.

The majority of the vibration energy in the operation of the damper of the above patent is absorbed by employing a restricted orifice piston. Such piston is adapted to move reciprocally in the chamber of a housing adapted to carry hydraulic fluid. Movement of such piston with respect to the fixed housing forces fluid through the orifice, generating heat and providing hydraulic damping.

In addition, the device of the above patent employs a Belleville spring arrangement in conjunction with the hydraulic piston to absorb a portion of the vibration. Such springs are disposed in the piston chamber and trapped therein between the housing and the piston. The springs also provide a damping action which absorbs some of the force of the movement of the piston.

It has been found that if fluid communication is not provided in the chamber on opposite sides of the piston between the spaces above and below the Belleville springs, fluid or oil is trapped which must be discharged during piston displacement. As noted in the above patent, the individual components or pieces of the Belleville springs closely abut each other and the opposite ends of the springs closely contact the wall of the chamber and the piston, thus undesirably blocking any fluid passage from the inner chamber to the outer chamber on opposite sides of the springs.

SUMMARY OF THE INVENTION

According to the present invention, the solution to the above problem has now been achieved by an improvement to the damper of the above patent in providing a communicating fluid path from the inner or lower chamber below the Belleville springs to the outer or upper chamber above the Belleville springs. This is accomplished according to a preferred embodiment by providing a flow path in the retainer between one end of the Belleville springs and the adjacent chamber wall, the retainer having multiple slots therein for fluid communication of the inner chamber below the Belleville springs with the outer chamber above the springs.

Thus, during piston displacement within the chamber, a fluid path is provided which by-passes and flows around the Belleville springs and permits fluid communication between the inner and outer chambers on opposite sides of the springs. This feature is necessary to provide consistent damping characteristics.

BRIEF DESCRIPTION OF THE DRAWINGS

FIG. 1 illustrates installation of the damping apparatus of the invention upon a single axle aircraft landing wheel;

FIG. 2 is a side elevation of the invention damper, partly in section, showing its cooperation with the torque arm linkage arrangement of the landing wheel strut;

FIG. 3 is a detail of the structure of the invention damper; and

FIG. 3a is a section taken on line 3a—3a of FIG. 3.

DETAILED DESCRIPTION OF THE PREFERRED EMBODIMENT

Referring particularly to FIG. 1, there is shown a landing gear strut 10 of an aircraft having an axle 12 connected thereto on which are mounted landing wheels 14. Strut 10 is of the telescoping type and is hydraulically operated to collapse and fold within the aircraft fuselage by actuating means well known in the art, e.g. as disclosed in the above patent.

Since strut 10 is formed of two elements, outer cylinder 16 and piston 18, one of which telescopes within the other, to insure that one member 18 is maintained in alignment with the other member 16 and the tires are maintained straight ahead without rotating with respect to each other, a linkage arrangement is provided comprised of an upper link 20 and a lower link 22, often referred to as the scissors link. Link 20 is connected to the outer cylinder 16 and link 22 is connected to the piston 18, which in turn is connected to the axle.

The torque links tend to move rotationally, and because of instability there is free play between the torque links. Thus, the unattached ends of the links 20 and 22 are connected to a damping structure 24 according to the invention, which functions to substantially absorb the kinetic energy of vibration transmitted from one of the links such as 22 and preventing transmittal to the other link 20. In this manner any undesirable vibrational torque is absorbed prior to transmittal to the landing gear strut and thus prior to reaching the structure of the aircraft to which it can cause damage.

Referring now to FIG. 2, showing the damper 24 of the invention, links 20 and 22 are connected in spaced relation on the damper 24, providing gaps 25 between the links and between link 20 and the damper structure, so as to enable the torque links to move back and forth with respect to each other. Torque link 22 is connected via a washer 26, spacer 28 and bolt 30 to the piston 32. The piston 32 carries piston rings 34 within an annular chamber 36. Chamber 36 is formed within a housing 38 and is radially bounded by sleeve 40 and piston rings 34. Elastoner seals 39 are provided between piston 32 and the housing 38. Piston 32 divides chamber 36 into equal chamber parts 41 and 43 for the purpose of confining a hydraulic fluid. Piston 32 has an axial passageway 42 including an orifice 44, connecting chamber portions 41 and 43. Torque link 20 is bolted to the housing 38 and hence is fixed with respect to torque link 22.

As the piston 32 moves with respect to the fixed housing 38 as result of axial movement of torque link 22, one of the two chamber portions 41 and 43 on opposite sides of piston 32 becomes smaller with respect to the other chamber portion so that oil is forced through the orifice 44 absorbing energy to provide a damping action which is dependent on the flow rate established by the diameter of the orifice.

Also, to assist in linear vibration damping and to absorb some of the force of the movement of piston 32, Belleville springs 46 and 48 are provided in chambers portions 41 and 43, respectively, disposed between piston 32 and the opposite walls of chamber 36. These are preloaded springs having a relatively high load on them, and are trapped between the piston and the housing in a certain area. It is thus seen that the springs 46 and 48 block fluid communication between each of the inner and exterior cavities 47 and 49 of chamber portions 41 and 43 below and above the springs therein. In the absence of fluid communication between each of such inner and outer cavities on opposite sides of the springs in each of chamber portions 41 and 43, hydraulic fluid is trapped which has to be discharged when the piston 32 moves back and forth, as through imperfect fit between Belleville springs 46 and 48. The multiple abutting Belleville washers of springs 46 and 48, it has been found from experience, do not provide sufficient clearance to permit passage of fluid across the springs between inner and outer chambers 47 and 49.

A communicating free flow fluid path is thus provided, according to the invention, between the inner and outer cavities 47 and 49 on opposite sides of springs 46 and 48, in each of chamber portions 41 and 43. This is achieved by utilizing the circular retainer 50, adding multiple flow slots 52 (see FIG. 3) positioned between the outer end of each of the Belleville springs 46 and 48 and the adjacent chamber wall. As more clearly seen in FIGS. 3 and 3a, the circular retainer 50 has a hub portion 54 and an outer flange portion 56, with the slots 52 passing through both portions. The retainer also has a lip portion 58 which functions to retain in position a flapper valve plate 62 and a wave washer spring 60. As piston 32 is reciprocated, fluid is accordingly free to flow from the lower or inner cavity 47 of each of chamber portions 41 and 43, below springs 46 and 48, through slots 52 of retainers 50, into the upper or outer cavities 49 of such chamber portions, and vice versa.

A reservoir 64 is provided exteriorly of the housing and functions to conduct fluid through passages 66 in housing 38 and via flapper valve plate 62 into chamber portions 41 and 43. The reservoir maintains the pressure within the fluid chamber 36 at approximately 50 psi for elimination of cavitation of the hydraulic fluid. The wave washer spring 60 and flapper valve plate 62 permit fluid free access from the reservoir to the chamber portions 41 and 43.

Although in the preferred embodiment herein described a slotted retainer plate is employed to provide fluid communication in the chamber between the cavities on opposite sides of the Belleville springs, it will be understood that other arrangements of flow paths can be provided that would achieve the desired communication between such cavities.

Thus, while only a single embodiment of the invention has been shown herein for the purpose of illustration, it will be apparent that various changes in the construction and arrangement of the parts may be resorted to without departing from the spirit and scope of the invention as defined by the appended claims.

What is claimed is:

1. In combination with an aircraft landing gear strut, a linkage assembly operatively associated with said strut, said linkage assembly comprising two separate links connected to a vibration damping assembly, said damping assembly functioning to substantially absorb the kinetic energy of vibration transmitted from one of said separate links and preventing transmittal to the other one of said separate links, said vibration damping assembly comprising a housing secured to one of said links, said housing being adapted to carry fluid in a chamber formed therein, piston means adapted to move relative to said housing within said chamber, said other link secured to said piston means, said piston means dividing said chamber into separate chamber portions, orifice means in said piston means, said orifice means communicating with the fluid in said chamber and allowing restricted fluid passage therethrough in response to relative movement of said piston means and said housing, and spring means positioned in said chamber portions for absorbing energy resulting from relative movement of said piston means and said housing, said spring means being constantly urging said piston means to occupy a predetermined position within said chamber, the improvement comprising means forming a free flow path for fluid communication between inner and outer cavities below and above said spring means in each of said chamber portions in response to movement of said piston means.

2. The combination of claim 1, said means forming said free flow path comprising passage means between the end of each of said spring means and the adjacent wall of said chamber to provide said fluid communication between said inner and outer cavities in said chamber portions.

3. The combination of claim 2, said spring means comprising a pair of Belleville springs disposed in said chamber portions between the wall of said chamber and said piston means.

4. The combination of claim 3, said means forming said free flow path comprising passage means between the outer end of each of said Belleville springs and the adjacent wall of said chamber.

5. The combination of claim 3, said passage means comprising a member in said chamber portions, said member positioned between the outer end of each of said Belleville springs and the adjacent chamber wall, said member having slots therein communicating said inner and outer cavities on opposite sides of each of said Belleville springs.

6. The combination of claim 1, and including a fluid reservoir and means communicating said fluid reservoir with said chamber for charging fluid under pressure to said chamber as needed.

* * * * *